US005483147A

United States Patent [19]
Ilic et al.

[11] Patent Number: 5,483,147
[45] Date of Patent: Jan. 9, 1996

[54] DECENTRALIZED EXCITATION CONTROL FOR AN ELECTRICAL POWER UTILITY SYSTEM

[75] Inventors: Marija D. Ilic, Sudbury; Jeffrey W. Chapman, Cambridge, both of Mass.

[73] Assignee: Massachusetts Institute of Technology, Cambridge, Mass.

[21] Appl. No.: 35,917

[22] Filed: Mar. 23, 1993

Related U.S. Application Data

[63] Continuation of Ser. No. 911,470, Jul. 10, 1992, abandoned.

[51] Int. Cl.⁶ ........................................................ H02P 9/30
[52] U.S. Cl. ................................ 322/25; 322/20; 322/29; 290/52
[58] Field of Search ................................... 322/19, 20, 22, 322/23, 25, 32, 58; 307/87

[56] References Cited

U.S. PATENT DOCUMENTS

| | | | |
|---|---|---|---|
| 3,784,896 | 1/1974 | Lakota | 322/20 |
| 3,936,722 | 2/1976 | Goto et al. | 322/20 |
| 4,333,021 | 6/1982 | Cresap et al. | 307/87 |
| 4,463,306 | 7/1984 | de Mello et al. | 322/25 |
| 4,527,226 | 7/1985 | Glennon | 363/41 |
| 4,701,689 | 10/1987 | Yuan et al. | 322/19 |
| 4,723,735 | 2/1988 | Eisenhaure et al. | 322/4 X |
| 4,855,664 | 8/1989 | Lane | 322/19 |
| 5,300,876 | 4/1994 | Takagi | 322/58 |
| 5,321,308 | 7/1994 | Johncock | 290/40 |

OTHER PUBLICATIONS

Symposium of the Application of Static Var Systems for system dynamic performance, IEEE Power Engineering Society, IEEE Publication No. 87TH0187-5-PWR, 1987.
Olwegard et al, Improvement of Transmission Capacity . . . , IEEE Transaction on Power Apparatus and Systems, PAS–100, 3930–3939, Aug. 1981.
Crenshaw et al, Excitation System Models . . . , IEEE Transactions on Power Apparatus and Systems, PAS–100: pp. 494–509, Aug. 1981.
Kailath, Linear Systems, Chapter 4, "Asymptotic observers and compensator Design." pp. 259–268, Prentice Hall, 1980.
Phadke, G., et al, "Integrated hierarchical computer systems for adaptive protective relaying and control of electric transmission power systems." Technical Report ORNL/Sub/85–22005/1, Energy Division, Oak Ridge National Lab, Nov. 1989, pp. 48–52.
M. D. Ilic and A. M. Starkovic, "Voltage Problems in Transmission Networks Subject to Unusual Power Flow Patterns", IEEE Transactions on Power Systems, 6(1): 339–348, Feb. 1991.
C. O. Lundstrom, et al., "The 200 Mvar Static Compensator in Hagby, Sweden", Cigre Conference (International Conference on Large High Voltage Electric Systems), Aug. 1984, Paper #38–02.
Sincovec, R. F., et al., "Solubility of large–scale descriptor systems", Technical Report, Boeing Computer Services, Seattle, Wash., 1979, pp. 4–6.
Zaborsky, J., et al., "Stabilizing Control in Emergencies Part 1. Equilibrium Point & State Determination", IEEE Trans. on Power Apparatus Systems, vol. PAS–100, No. 5, May 1981, pp. 2374–2380.

(List continued on next page.)

*Primary Examiner*—Steven L. Stephan
*Assistant Examiner*—Nicholas Ponomarenko
*Attorney, Agent, or Firm*—Wolf, Greenfield & Sacks

[57] ABSTRACT

A power utility system includes a generator driven by a prime mover in response to a mechanical input power and an excitation to provide an electrical output power. The excitation of the generator is controlled in response to an estimated equilibrium rotor angle. The estimation of the rotor angle is based on purely local measurements. This estimated rotor angle is used in conjunction with a feedback linearizing controller to provide field excitation control of the generator. The rotor angle reference signal is also used to provide a rotor angle error signal to a power system stabilizer which is modified to operate on the basis of an angle error rather than a speed or frequency error.

36 Claims, 4 Drawing Sheets

OTHER PUBLICATIONS

Zaborsky, J., et al., "Stabilizing Control in Emergencies Part 2. Control by Local Feedback", IEEE Transactions on Power Apparatus and Systems, vol. PAS-100, No. 5, May 1981, pp. 2381-2389.
J. Zaborszky et al., "Local Feedback Stabilization of Large Inter Connected Power Systems in Emergencies", Automatica, vol. 17, No. 5, pp. 673-686, 1981.
J-J. E. Slotine et al., "Feedback Linearization", Chapter 6, Applied Nonlinear Control, pp. 207-273, Prentice-Hall, 1991.
P. Kundur et al., "Applicaiton of Power System Stabilizers for Enhancement of Overall System Stability", IEEE Transactions on Power Systems, vol. 4, No. 2, May 1989, pp. 614-626.
F. P. Demello et al., "Concepts of Synchronous Machine Stability as Affected by Excitation Control", IEEE Transactions on Power Apparatus and Systems, vol. PAS-88, No. 4, Apr. 1969, pp. 316-329.
E. V. Larsen et al., "Applying Power System Stabilizers Part I: General Concepts", IEEE Transactions on Power Apparatus and Systems, vol. PAS-100, No. 6, Jun. 1981, pp. 3017-3024.
E. V. Larsen et al., "Applying Power System Stabilizers Part II: Performance Objectives and Tuning Concepts", IEEE Trans. on Power Apparatus and Systems, vol. PAS-100, No. 6, Jun. 1981, pp. 3025-3033.
E. V. Larsen et al., "Applying Power System Stabilizers Part III: Practical Considerations", IEEE Trans. on Power Apparatus and Systems, vol. PAS-100, No. 6, Jun. 1981, pp. 3034-3046.
J. Zaborszky et al., "Local Feedback Stabilization of Large Inter Connected Power Systems in Emergencies", Automatica, vol. 17, No. 5, pp. 673-686, 1981.
Anderson, P. M., et al., Power System Control and Stability, vol. 1, The Iowa State University Press, Ames, Iowa, 1977.
J. W. Chapman, "Feedback Linearizing Generator Excitation Control for Enhanced Power System Stability", submitted May 22, 1992, to MIT Dept. of Electrical Engineering.
Luenberger, D. G., Introduction to Dynamic Systems, Theory, Models & Applications, Chap. 4, "Linear State Equations", John Wiley & Sons, 1979.
Bronislaw Jakubczyk et al., "On Linearization of Control Systems" Systems Control, vol. 28, No. 9-10, pp. 517-522, 1980.
Philippe Hugoud et al., "Improving System Stability by Field Voltage Control of Synchronous Machines", RGE (Special Issue), pp. 64-91, Jul. 1980.
M. L. Crenshaw et al., "Excitation System Models for Power System Stability Studies", IEEE Transactions on Power Apparatus and Systems, vol. PAS-100, No. 2, pp. 494-509, Feb., 1981.
V. Vittal et al., "Analysis of the Inter-Area Mode Phenomenon In Power Systems Following Large Disturbances", IEEE, Transact. on Power Systems, vol. 6, No. 4: 1515-1521, Nov. 1989.
S. Yokokawa et al., "Multivariable Adapative Control for a Thermal Generator", IEEE Transactions on Energy Conversion, vol. 3, No. 3, pp. 479-486, Sep., 1988.
Fong K. Mak et al., "Towards Most Effective Control of Reactive Power Reserves in Electric Machines", PSCC '90, Aug. 1990, Graz, Austria .
J. R. Smith et al., "A Supplementary Adaptive Var Unit Controller for Power System Damping", IEEE Transactions on Power Systems, vol. 4, No. 3, pp. 1017-1023, Aug., 1989.
J. R. Smith et al., "An Enhanced LQ Adaptive Var Unit Controller for Power System Damping", IEEE Transactions on Power Systems, vol. 4, No. 2, pp. 443-451, May 1989.
John F. Hauer, "Robust Damping Controls for Large Powers Systems" IEEE Control Systems Magazine, pp. 12-18, Jan. 1989.
Dennis Hansen et al., "Monitoring Power System Stability", IEEE Computer Applications in Power, pp. 14-18, Apr. 1989.
S. Kaprielian et al., "Feedback Stabilization for an AC/DC Power System Model", Proceedings, 29th IEEE Conference on Decision and Control, Dec. 1990, pp. 3367-3372.
W. Mielczarski et al., "Nonlinear Controller For Synchronous Generator", IFAC Nonlinear Control Systems Design Symposium 89, Capri, Italy, 14-16 Jun. 1989.
C. Concordia, Synchronous Machines, Theory and Performance, Wiley, 1951.
F. K. Mak, "Analysis and Control of Voltage Dynamics in Electric Power Systems", PhD Thesis, University of Illinoise at Urbana, Champaign, 1990.
Brockett, R. W., 31., Finite Dimensional Linear Systems, 1970, John Wiley & Sons, pp. 198-205.
Ilic, M., et al., "A New Class of Fast Nonlinear Voltage Controllers and Their Impact on Improved Transmission Capacity", American Control Conference 1989.
Isidori, A., "5 Elementary Theory of Nonlinear Feedback for Multi-Input Multi-Output Systems", Nonlinear Control Systems, Springer-Verlag 1989, pp. 235-288.
Liu, C-C., et al., "Power System Small-Disturbance Stability Analysis Using Circuit-Theoretic Techniques", Proceedings, IEEE Int'l Symposium on Circuits and Systems, May 1992.
Krause, P. C., "Theory of Synchronous Machines", Analysis of Electric Machinery, McGraw-Hill 1986, pp. 211-267.
Hunt, L. R., et al., "Design for Multi-Input Nonlinear Systems", In Differential Geometric Control Theory, pp. 269-297, Birkhauser, New York 1982.
Lu, Qiang, et al,, "Nonlinear Stabilizing Control of Multimachine Systems", IEEE Transactions on Power Systems, vol. 4, No. 1, Feb. 1989, pp. 236-241.
Cresap, R. L., et al., "Small-Signal Modulation of the Pacific HVDC Intertie", IEEE Transactions on Power Apparatus and Systems, vol. PAS-95, No. 2, Mar./Apr. 1976, pp. 536-541.
Olwegard, A., et al., "Improvement of Transmission Capacity by Thyristor Controlled Reactive Power", IEEE Transactions on Power Apparatus & Systems, vol. PAS-100, No. 8, Aug. 1981, pp. 3930-3939.
Bayer, W., "Dynamic Reactive Power Compensation Using Advanced Control for Increasing Transmission System Capability", In Cigre Conference Proceedings, 1990 Session, Aug. 26-Sep. 1, Aug. 1990, Paper #37-302.
Sauer, P. W., "An Integral Manifold Approach to Reduced Order Dynamic Modeling of Synchronous Machines", IEEE Transactions on Power Systems, vol. 3, No. 1, Feb. 1988, pp. 17-23.
Klein, M., et al., "A Fundamental Study of Inter-Area Oscillation In Power System", IEEE Transactions on Power Systems, 6(3): 914-921, Aug. 1991.
Mielczarski, W., "Observing the state of a synchronous generator Part 1. Theory", Int. J. Control, 1987, vol. 45, No. 3, 987-1000.
Mielczarski, W., "Observing the state of a synchronous generator Part 2. Applications", Int. J. Control, 1987, vol. 45, No. 3, 1001-1021.
Marino, R., "An Example of a Nonlinear Regulator", IEEE Transactions on Automatic Control, vol. AC-29, No. 3, Mar. 1984, pp. 276-279.

DECENTRALIZED EXCITATION CONTROL FOR AN ELECTRICAL POWER UTILITY SYSTEM

This application is a continuation of application Ser. No. 07/911,470, filed Jul. 10, 1992 now abandoned.

FIELD OF THE INVENTION

The present invention relates to decentralized excitation control (i.e., based on local measurements) for an interconnected electrical power utility system. More particularly, the present invention relates to excitation control of a power system, based on an estimated equilibrium rotor angle using local measurements. The system is capable of stably responding to power system transients such as line outages, generator failures and the addition of transmission lines and generators.

BACKGROUND OF THE INVENTION

Typical electrical power utility systems use a network of power generators to provide electrical power via transmission lines in a transmission grid, to numerous loads. Each generator generates electrical power in response to a real input mechanical power, such as that provided by steam pressure or water flow, and an excitation control system which provides a reactive power output and which ensures that the generator provides a desired target voltage for each transmission line. A problem to be solved by a control system for such an electrical power utility system (hereafter simply a "power system") is maintaining the power system in equilibrium in spite of transients, which may cause the network of generators to go into mechanical oscillation in response to excess electrical energy being fed into the grid during the transient. That is, despite these transients, it is necessary, if the integrity of the power specifications are to be maintained, that each generator be kept operating at an angular velocity and a rotor angle (the angle between a point on the generator shaft and some arbitrary, synchronously rotating reference, such as a clock reference signal, defined for the generator network) which insures that the electrical output power matches the mechanical output power and that voltage limits of the generator are not violated.

Furthermore, any control must stabilize power system transients in the first few seconds subsequent to the transient, during a period of time when the system may have changed drastically, and/or may be subject to multiple transients, due to multiple transmission line reclosures or cascading equipment losses.

System changes or disturbances, causing transients for which a control system must compensate, are changes in the network configuration, loading and power transfer characteristics—e.g. loads being added to or removed from the transmission network, generators being added to or removed form the network (e.g., due to failures) and transmission lines being connected to or disconnected from the grid (e.g., due to storm damage). Mechanical oscillations of the generators resulting from transients due to such changes are highly undesirable. They must be damped and excess energy must be dissipated. System changes or disturbances may also cause the equilibrium point of the power system to change.

A further problem to face when designing a control system is anticipating that a power system may be loaded beyond its original design specifications. When a power generating center is geographically removed from a major center of power consumption such loading is increasingly common. Much of the motivation to transfer large amounts of power is economic, arising out of efforts to maximize power generation from nuclear and hydroelectric plants and to lighten the load on more expensive fossil-fuel plants. Thus, the development of more effective controls translates directly into more economical operation of the power system.

However, increased loading results in increasingly heavy power transfers over long transmissions lines. The transmission lines are thus operated closer to maximum power transfer limits, as defined by power flow equation. Stability problems, resulting from such heavy transmission line loading, further limit the operation of a power system. Moreover, synchronizing torque, generated by a swing in the generator rotor angle away from the equilibrium position, is not only weaker in terms of the change of output power for a unit change and rotor angle, but also becomes more nonlinear as a transmission line approaches its transfer limit.

As transmission line loading increases, a system may also exhibit a tendency towards poorly-damped oscillations, involving the rotor angles of many generators in widely separated areas (so-called multimachine or winter-area oscillations), that occur predominantly in a frequency range of approximately 0.5–0.8 Hz. These factors may limit the amount of transferable power to a value well below the thermal limit of the transmission line, because of the need to assure the integrity of the power system in the event of transients. For a given operating condition, if the integrity of a power system cannot be assured for any reasonably foreseeable transient, then its control system is not viable for normal operation, even though it may be nominally stable. Poorly damped oscillations of the type described have been experienced in the western and northeastern areas of the United States, and in many systems world wide.

The mechanism behind inter-area oscillations of generators is not fully understood, however there have been conjectures that they may be a result of nonlinear coupling phenomenon. They may be aggravated by improper control system design. The problem may also be linked to the problems of voltage instability that occur on heavily-loaded transmission lines that have insufficient reactive power support. That is, a lack of reactive power support, coupled with low load-bus voltages, may create a "voltage collapse" situation in which load-bus voltages decline at the same time that generators hit power transfer limits, further reducing the capability for existing types of control to damp electromechanical oscillations. Such electromechanical oscillations directly constrain the operation of many power systems.

In order to design more effective control, a major limiting factor is the lack of power system information available to any given controller. This information is limited to locally available measurements due to difficulties in transmitting measurements over large distances. The limits on available information have a direct impact on the ability to design sufficiently robust and reliable linear controllers. The anticipation of large changes to a power system also should be considered. Any practical control for stabilizing transients therefore should be designed to use only information that is available at the site of the controller.

It should be further recognized in the design that there will be large disturbances that will push the system beyond the limits of the validity of a small-signal model. Often these disturbances are accompanied by structural changes in the system itself. A linear approximation of the system that is acceptable for one operating condition may be rendered completely inaccurate by either slowly evolving load changes or by step changes that occur as a result of power system faults. Consequently, any controller that relies upon a given static model may not operate satisfactorily as the power system changes.

Some work has been done in the area of online power system identification for the purpose of control, but since the order of a power system is generally unknown, and can change instantaneously, an assumed order that is used for estimation of the external system may result in a good approximation one minute and a poor one the next. The rate at which accurate estimation may occur is limited by the fact that there are many orders of dynamics that are ignored based on time scale separation. Raising the sampling rate of an estimator causes the faster dynamics of the power system to affect the estimate. Given the fact that good control is most critical at exactly when the system model is most uncertain, trade-offs must be made between modeling inaccuracies and optimal control and robustness. In addition, since many of the control schemes that have been proposed perform closed-loop identification, and generally have been formulated in the theoretical framework of adaptive control, the issues of control stability beyond the empirical evidence of low-order simulations are largely unanswered.

Efforts have been made to utilize devices such as fast reactive power compensators (e.g., static VAR compensators) and high voltage DC tie lines in order to enhance system damping, using various types of linear controllers. Reactive power compensators have traditionally been used to maintain a near-constant voltage on a give bus. HVDC tie lines maintain a near-constant real power transfer. Recent work indicates that a more integrated systems approach to the overall network control problem may result in more effective use of these devices for stable system operation.

The shift in emphasis in the use of voltage support equipment for stability enhancement has been away from the concept of maintaining a constant voltage at the device terminals, toward the use of the device's reactive power capacity as a means of stabilizing oscillations in transferred power, at the expense of some fluctuation in the terminal voltage. This is the purpose of a power system stabilizer (PSS), which modulates the setpoint of a generator voltage controller to achieve a gain in stability.

Current state of the art power system stabilizers (PSS) do not require any a priori knowledge of the post-disturbance equilibrium point and operate as linear, constant gain devices. A PSS develops a voltage correction term that is added to a constant voltage reference term. This sum is compared to the actual generator terminal voltage to arrive at a voltage error signal for the voltage regulator (or exciter) of the generator. A common type of PSS is shown in FIG. 1. It includes a prime mover 10, such as a turbine, which provides real mechanical input power, in response to steam pressure of water flow, to a generator 12. The generator has a shaft (not shown) whose rotation speed is determined by a shaft speed transducer 14. The exciter 16 modulates the generator excitation, in response to a voltage error signal, so that the generator terminal voltage matches the target voltage. The voltage error signal is determined (in the illustrated system) based upon a speed or frequency error signal, by comparing a reference speed 18 to the shaft speed such as with a simple adder 20. The shaft speed error signal is applied to the PSS 22, which uses one or more linear control functions to produce an output voltage correction term. The output of the PSS is substrated, with a simple adder 26, along with the determined generator voltage, from a voltage reference 24 to provide a voltage error signal which is provided to the exciter 16.

A typical PSS is thus used to provide damping torque, which is analogous to the viscous damping of a spring-mass-dashpot system. The PSS is normally tuned to provide damping at some critical frequency of machine oscillation, and some effort is typically made to assure that other potential oscillation modes are not aggravated by the selected tuning parameters. Because of the difficulty of generating a signal representing the error in the generator rotor angle, this signal is not used as an input to typical power system stabilizers. The characteristics of these PSS vary significantly with transients in the power system. In particular, since the power system is nonlinear, a system change may render non-optimal an optimal, linear PSS. That is, the tuning of the PSS may become invalid, and may become troublesome in stabilizing the power system after a large transient.

All of the above methods achieve some improvement in power system stability, but all are limited by robustness problems due to the nonlinearity of the power system. As the transmission line approaches the maximum power transfer limit, the range of accuracy of small signal models (i.e., linearized models) that form the basis for linear controllers becomes progressively more limited. Moreover, some aspects of the power system are highly nonlinear precisely when the power system is most likely to be unstable, i.e, when damping large oscillations occurring over heavily loaded transmission lines. In view of these problems some researchers have proposed nonlinear control systems for synchronous generators.

One well-known type of nonlinear control system is called feedback linearizing control (FBLC). The general form of FBLC is well documented, and theoretical background may be found in *Applied Nonlinear Control*, Prentice Hall, 1991, by J.-J. E. Slotine and Weiping Li.; *Nonlinear Control Systems* Springer-Verlag, 1989 by Alberto Isidori; F. K. Mak and M. D. Ilic, "Towards most effective control of reactive power reserves in electric machines", pages 359–367, Graz, Austria, August 1990, 10th Power System Computation Conference; and "A new class of fast nonlinear voltage controllers and their impact on improved transmission capacity", American Control Conference, 1989 by M. Ilic and F. K. Mak.

FBLC forces the generator dynamics to obey the following differential equation:

$$\dot{\omega} = a_0(\delta - \delta_0) + a_1(\omega - \omega_0) + a_2\dot{\omega} \quad (1)$$

where $\omega$ represents the frequency of the AC voltage of the machine, and $\delta$ represents the rotor angle of the generator in the Park/Blodel transformed frame of reference. A derivative of a variable, e.g., $\omega$, with respect to time is represented as $\dot{\omega}$. $\delta$ satisfies the relationship:

$$\dot{\delta} = \omega - \omega_0 \quad (2)$$

The coefficients $a_0$, $a_1$ and $a_2$ in (1) are selected based on well established linear systems theory to achieve a stable system with desirable transient response characteristics.

The equilibrium point of this subsystem is at $\dot{\omega} = 0$, which can only be satisfied when $$\dot{\omega} = 0 \quad (3)$$

$$\omega = \omega_0 \quad (4)$$

$$\delta = \delta_0 \quad (5)$$

Although this equilibrium definition also holds 4 or a linearized control system such as the PSS, linear systems do not base control on this definition. The value of $\omega_0$ is fixed by the power system frequency, but value of $\delta_0$ depends on the configuration and loading of the system and, in general, cannot be calculated without full knowledge of the system voltages, loading and configuration, and even then requires a computationally intensive calculation. Moreover, $\delta_0$ can only be measured with respect to a power system wide reference which cannot be maintained as a local measurement. Since the value of $\delta_0$ must be available to the FBLC exciter for proper operation, and in particular, since the use of an invalid rotor angle reference causes loss of control of the generator voltage, FBLC is impractical unless the problem of computing or measuring $\delta_0$ can be resolved.

All methods of FBLC presented to date have been limited by the fact that the desired post-disturbance equilibrium point for the generator must be known a priori, if the control is to work properly on a system having many generators. The information that can be used for the generator control is limited primarily to measurements that can be made locally at the site at which the generator is located. Unfortunately, the loading and configuration of the entire system, which cannot be determined locally, must be known in order to calculate the equilibrium point for any given generator. Since the desired equilibrium point changes with every change in the system, any practical control must be capable of responding to the system changes, which occur frequently. No mechanism has previously been developed for FBLC controllers to adjust to the evolution of the equilibrium point of a generator over time, without relying upon information from distance parts of the system that is normally unavailable. Thus, there is typically not enough information available to assure that the power system is stabilized after a large transient while assuring that the generator terminal voltage returns to a preset value.

In 1981, a different nonlinear control system (the Observation Decoupled State Space, or, ODSS) was proposed by J. Zaborszky, K. V. Prasad, and K. W. Whang, in "Stabilizing control in emergencies", part 2, IEEE *Transactions on Power Apparatus and Systems*, PAS-100(5):2381–2389, 1981. In ODSS, the equilibrium point of the power system is estimated, including a calculation of an estimated $\delta_0$ (i.e., rotor angle), based on local measurements of voltages and phases of transmission lines connected to the generator. This system is based on the solution of the equilibrium equation:

$$P_m - P_e = 0 \tag{6}$$

where $P_m$ is the mechanical input power and $P_e$ is the electrical output power. This may be expressed a function G which represents the mismatch, or difference, between the generator input power and electrical output power. G may be expressed as a function of all of the line voltages $V_i$ and phases $\theta_i$ of K connected transmission lines:

$$G(V_1, \ldots, V_K, \theta_1, \ldots, \delta_r, \ldots, \theta_k) = 0 \tag{7}$$

and which includes measuring the generator terminal voltage. These equations are solved to yield an estimated equilibrium rotor angle $\delta_r$.

ODSS relied on fast modulation of the real input power (or torque) to the generator or on fast control of the electrical output power via braking resistors and load skipping. Load skipping means that loads are switched on and off in short pulses. Braking resistors are networks of large resistors that are used to dissipate large amounts of power. There are many practical difficulties with this control system, however. First, all the methods for fast real power control, (i.e., for controlling the real input power or torque) are very expensive and create significant mechanical stress on the generator shaft. The potential for damage from torsional oscillations of the generator shaft compounds this problem. These control actions are also not especially flexible. For instance, both load skipping and braking resistors can only be used in short, discrete pulses.

A feature of ODSS is the estimation of the equilibrium rotor angle $\delta_r$ using only local measurements, including the use of a locally generated reference signal based on the nominal system frequency (e.g., in the U.S., 60 Hz). The reference signal does not need to be synchronized to any other part of the power system. It therefore provides a method for generating a rotor angle error signal based upon a direct measurement of the shaft position, with respect to the phase angle of the reference signal. This is a departure from conventional methods that require all angles to be measured with respect to a system wide reference.

A further drawback of ODSS, however, is that the estimation of $\delta_r$ assumes that the terminal voltage of each generator was both separately controlled and constant. The estimation of $\delta_r$ is unstable when used to control the terminal voltage of the generator. More generally, the proposed calculation is unstable when variations in the local generator voltage are dynamically coupled to large power system transient behavior.

Accordingly, it is the general aim of the invention to provide an excitation control system for an electrical power utility system, which controls the generator voltage using an approximation of the equilibrium rotor angle.

It is also an object of the present invention to provide an excitation control system for a power utility system which increases power transfer capability on existing transmission lines.

SUMMARY OF THE INVENTION

The present invention is a controller which controls the excitation of a generator of an electrical power utility system based upon local measurements and upon an estimated post-disturbance equilibrium rotor angle. Such a control system may be implemented as a feedback linearizing control system or as a power system stabilizer (PSS).

An electrical power system, in accordance with the invention, includes a generator which provides electrical output power to a transmission line in response to an excitation and mechanical input power. Sensors provide local measurements of process variables from which the mechanical input power may be determined. Other sensors provide signals indicative of the phase current voltage on transmission lines attached to the generator. A post-disturbance equilibrium rotor angle $\delta_r$ is estimated based on the local measurements and a desired generator terminal voltage. A controller provides an excitation to the generator in response to the estimated post-disturbance equilibrium rotor angle $\delta_r$.

The controller, implemented as a feedback linearizing controller (FBLC), is stable under variations in the local generator voltage creating a control which can be implemented using local measurements, and which achieves desired steady state operating conditions. This control scheme creates a time varying equilibrium for each generator such that the machine operates in steady state at the desired power output and voltage, while achieving superior performance during and after power system disturbances and transients such as transmission line outages. The combined system further minimizes interaction between generators, reducing the control coordination problem.

The controller may also be implemented as a power system stabilizer PSS based on a rotor angle error signal. In this type of PSs, the generator rotor angle is measured with respect to a locally generated reference signal, using a position encoder on the generator rotor shaft. The measured rotor angle is compared to the estimated equilibrium rotor angle to provide a rotor angle error signal, which is applied to a standard PSs. The gain and pole positions of the PSS are altered to achieve optimal operation, but this is a minor adjustment.

Also, with such a PSS, the use of an estimated post-disturbance equilibrium rotor angle develops a synchronizing torque, analogous to the restoring force of a spring, proportional to the magnitude of the rotor angle perturbation away from the equilibrium position. Thus use of synchronizing torque enhances the performance of existing controls, particularly in situation where heavy transmission line loading has reduced a natural synchronizing torque of the system.

It has been shown in simulation that the behavior of the nonlinear controller, i.e., the FBLC, is far superior compared to standard linear controllers, in damping oscillations and in maintaining power system integrity following a severe fault. Simulations were done on a model that preserves several orders of system dynamics beyond what was used for the control design, and include a significant number of conventionally-controlled generators, so that the design of the test power system was not driven by the design of the controller. Instead, the controls were tested on a model that was designed first to demonstrate credibly the most critical modes of multimachine oscillations on the Northeast Power Coordinating Council power grid. The successful stimulations suggest that present electrical power and utility systems could benefit from this type of control.

DETAILED DESCRIPTION

Figure 1:
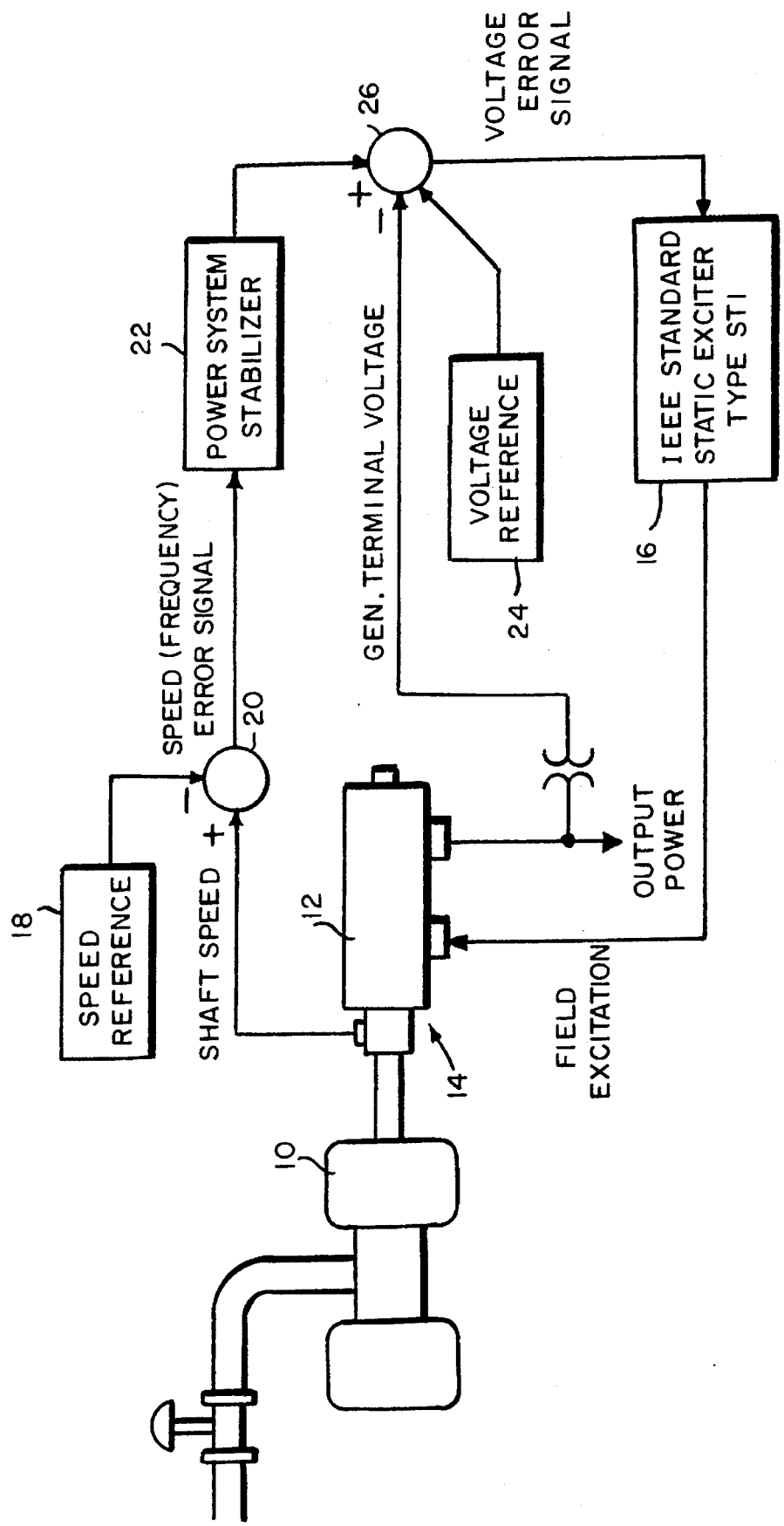
FIG. 1 is a block diagram of a typical electrical power generator equipped with a power system stabilizer (PSS)
Figure 2:
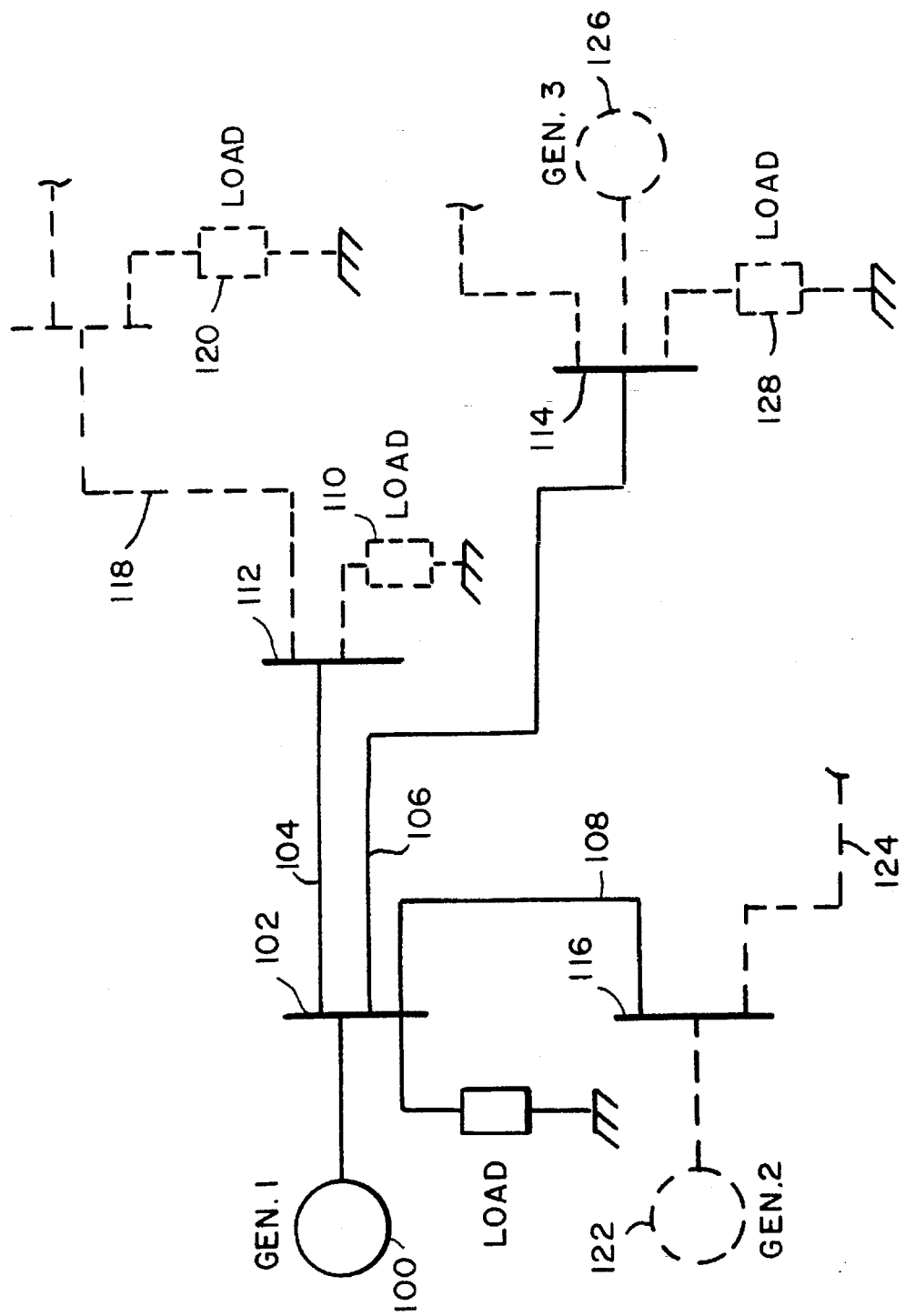
FIG. 2 is a block diagram illustrating an interconnected power system in which the present invention may be used.
Figure 3:
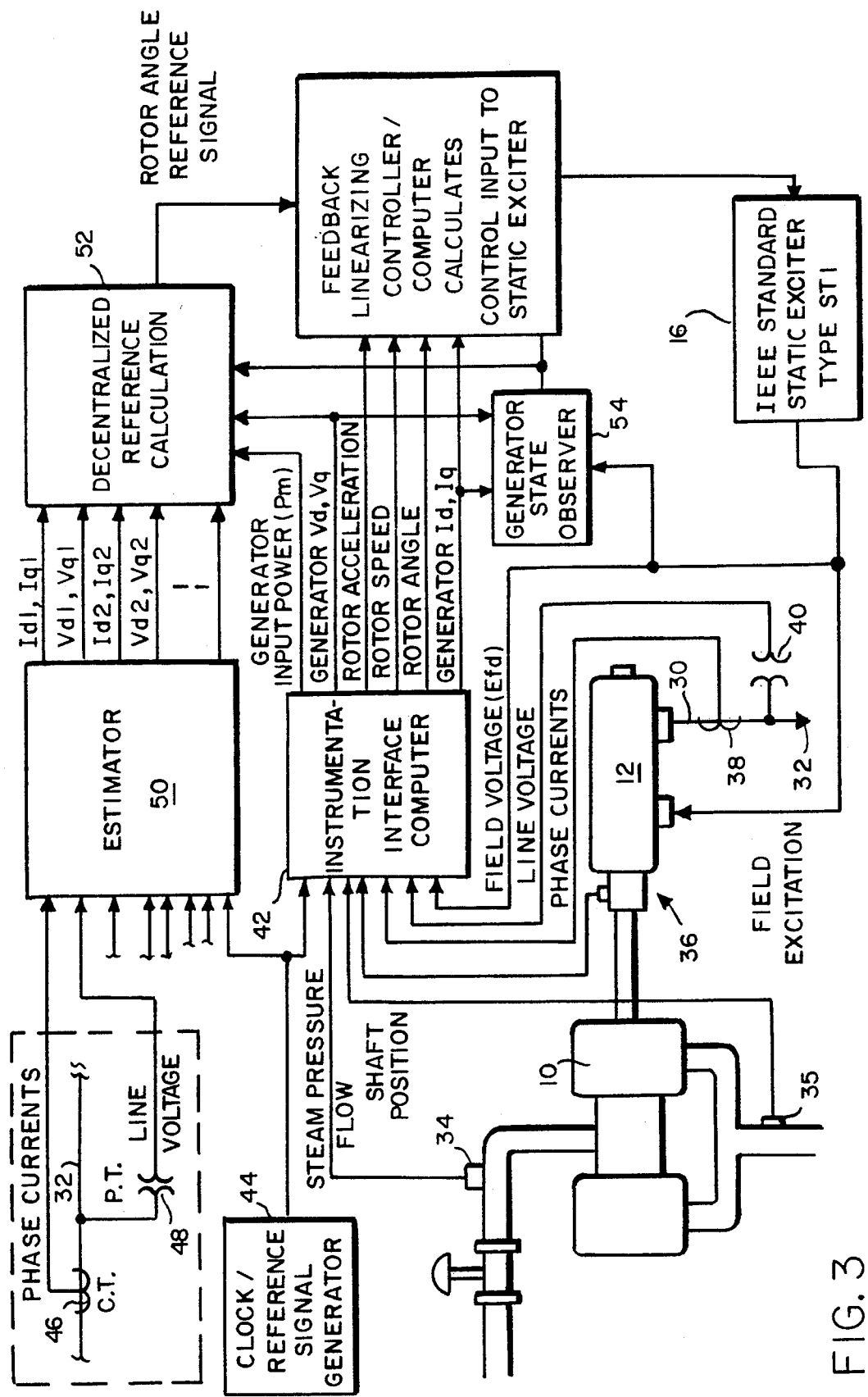
FIG. 3 is a block diagram of an electrical power system with a feedback linearizing control system in accordance with the present invention.
Figure 4:
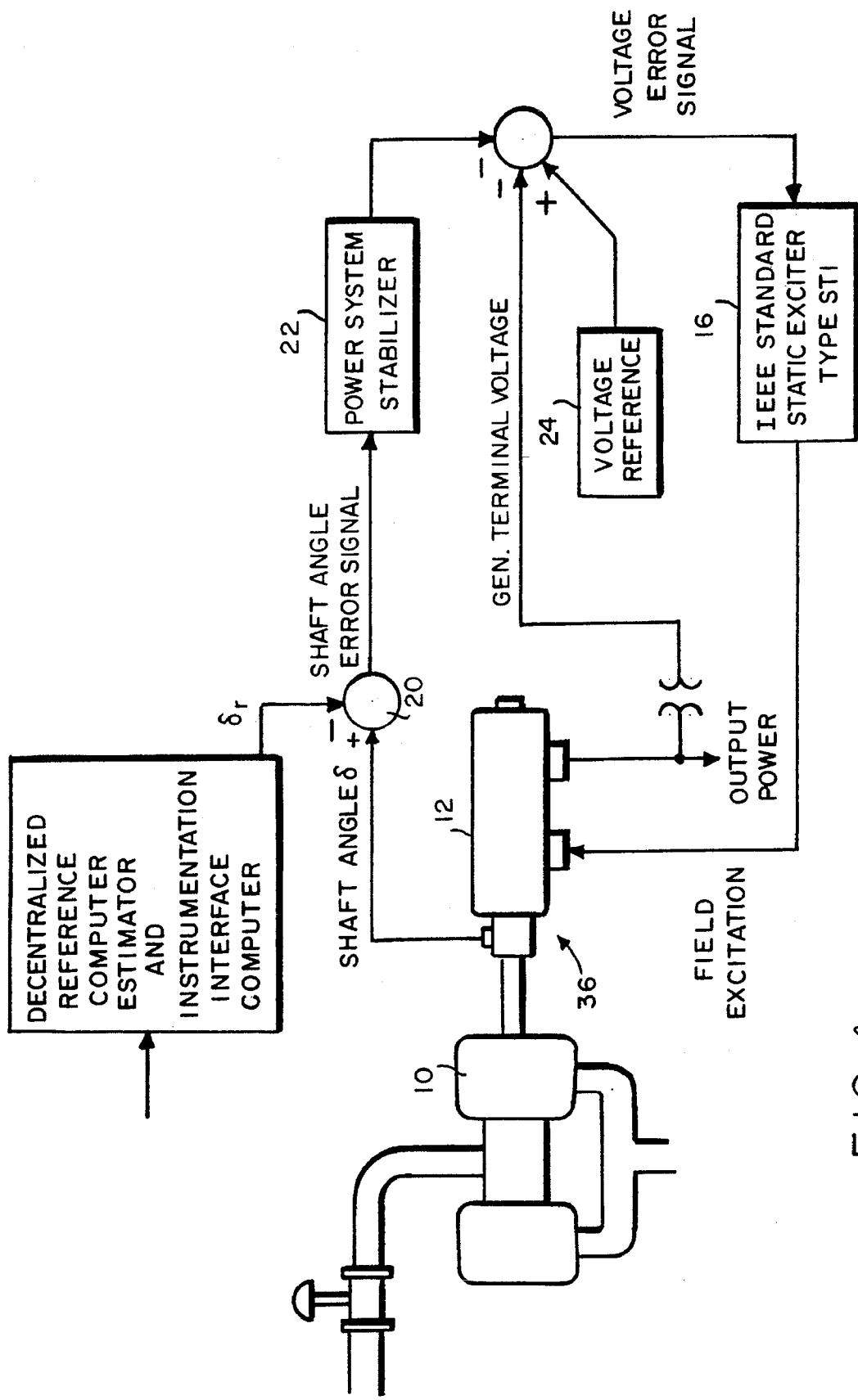
FIG. 4 is a block diagram of an electrical power system with a power system stabilizer in accordance with the present invention.

A detailed description of the invention will now be provided in connection with FIGS. 2–4, in which similar reference numerals indicate similar structures.

In order to provide background identifying the setting for a controller for a generator in a power system, FIG. 2 will now be described. In FIG. 2, a generator 100 is attached to a bus 102. Bus 102 is referred to as the local bus of the generator 100. The transmission lines which are considered local to generator 100 are those which are attached to the local bus 102. In this figure, they are transmission lines 104, 106 and 108. Each transmission line is defined by the local bus at its proximate or sending end and by the first load or branching line attached to the transmission line at its distal or receiving end. For example, the first load attached to transmission line 104 is load 110 which defines the distal end of line 104. The end of this transmission line is relevant to the estimation of the rotor angle of generator 100, as described below. The ends of transmission lines 104, 106 and 108 (buses 112, 114 and 116 respectively) determine the extent of the power system which is considered by the controller of generator 100. Thus, the effects of load 110, transmission line 118, load 120, generator 122, transmission line 124, generator 126, and load 128 are not considered by the controller for generator 100.

With this background, a feedback linearizing control system, in accordance with the present invention, will now be described in connection with FIG. 3. An electrical power utility system includes a prime mover 10, such as a turbine, which rotates a shaft (not shown) of the generator 12 in response to a real mechanical input power, such as steam pressure or water flow.

An exciter 16, such as an IEEE Standard Static Exciter Type ST1 provides a desired field excitation to the generator 12. Such exciters are commonly used and have been produced by several manufacturers such as General Electric, Westinghouse and others. Such exciters are fast, static exciters in which the field voltage may be directly controlled via a reference error signal. The IEEE type ST1 exciter normally operates on the basis of a terminal voltage error, (see IEEE Committee Report Excitation System Models for Power System Stability Studies. *IEEE Transactions on Power Apparatus Systems*, PAS-87:1460–1466, June 1980, for a description of the IEEE ST1 type exciter,) but is modified to operate in response to a field voltage error signal. Such a modification is simple and within the ability of one skilled in the art. Generator 12, in response to a real input power and the desired field voltage from the exciter 16, provides electrical output power 30 to at least one transmission line 32.

Various sensors are used to obtain information from the prime mover 10, generator 12 and transmission line 32. A sensor 34 is used to determine the pressure, temperature and flow of the input to the prime mover 10. A second sensor 35 is used to determine the pressure and temperature of the output of the prime mover. From the measurements of sensors 34 and 35, the real input power $P_m$ can be determined. A shaft position encoder 36 is used to determine the shaft position (i.e., rotor angle δ), speed ω and acceleration ω' of the rotor for generator 12. The shaft position encoder 36 is a typical optical or magnetic pickup that converts rotor rotation into a series of electrical pulses. From these pulses, the rotor angle δ, speed ω and acceleration ω' can be determined. Sensors 38 and 40 on the generator terminals determine phase currents and line voltage, respectively, which are actually a set of three currents, $i_a$, $i_b$ and $i_c$, and voltages, $v_a$, $v_b$ and $v_c$.

The information form the sensors concerning pressure, temperature and flow, shaft position, line voltage and phase current are provided to an instrumentation interface computer 42. This computer has digital signal processing capabilities, such as an IBM-compatible industrial computer fitted with a digital signal processing board and data acquisition board (e.g., A/D converter). This computer is used to convert raw measurements of the shaft position, generator terminal voltage and current, the excitation field voltage $E_{fd}$ and process variables such as the pressure, temperature and flow into a digitized data flow to be used by other parts of the system, to be described later. With this computer 42, shaft encoder measurements are converted into rotor angle δ, speed ω and acceleration ω' signals. Measurements of the generator voltage V and current I are converted to a D–Q reference frame (to be described later) and the process variables are used to calculate the mechanical input power $P_m$ to the generator. Sampling is synchronized and precisely controlled by using a clocking signal, such as provided by clock or reference signal generator 44, providing a signal at the nominal power system frequency, which in the United States is 60 Hz.

The rotor angle $\delta$ is determined from the difference in the number ($n_s$) of pulses received from the shaft encoder 36 and the number ($n_c$) of reference pulses supplied from the clock/reference signal generator 44. If the shaft encoder 36 sends a pulse for every angle change of $\phi$, then for a difference $n_s - n_c = N$, the rotor angle is $$\delta = N\phi. \tag{8}$$

The rotor speed $\omega$ is determined by the time interval between successive pulses of the shaft encoder 36:

$$\omega(t_i) = \frac{\phi}{t_i - t_{i-1}} \tag{9}$$

The rotor acceleration is calculated by the following relation:

$$\omega(t_i) = \frac{\omega_i - \omega_{i-1}}{t_i - t_{i-1}} \tag{10}$$

The generator voltage and current are converted to a D-Q reference frame, so that the three-phase voltage and current measurements ($v_a$, $v_b$ and $v_c$ and $i_a$, $i_b$ and $i_c$) taken at each time point are reduced to a direct component and a quadrature component, plus the so-called "0 sequence" component which is not used. These calculations are performed according to the following relationship:

$$\begin{bmatrix} v_D \\ v_Q \\ v_o \end{bmatrix} = \sqrt{2/3} \begin{bmatrix} \cos(\theta) & \cos(\theta - 2/3\pi) & \cos(\theta + 2/3\pi) \\ \sin(\theta) & \sin(\theta - 2/3\pi) & \sin(\theta + 2/3\pi) \\ \frac{1}{\sqrt{2}} & \frac{1}{\sqrt{2}} & \frac{1}{\sqrt{2}} \end{bmatrix} \begin{bmatrix} v_a \\ v_b \\ v_c \end{bmatrix} \tag{11}$$

where the instantaneous phase voltages are represented by ($v_a$, $v_b$, $v_c$). The same calculation is used, substituting the phase currents for the phase voltages, to arrive at the line currents in the D-Q reference frame. The reference angle $\theta$, or, preferably, the values of the sines and cosines in the equation above, are generated by the reference signal generator 44 for each sampling instant.

The mechanical input power $P_m$ can be determined using well known equations based on the pressure, temperature an flow of the input to the turbine and the pressure and temperature of the output from the turbine. $P_m$ is assumed to be slowly evolving with respect to changes in excitation control. This quantity may be reduced by any determined mechanical losses of the generator/prime mover system. Other methods may be used for calculating the mechanical input power to the generator, and the present invention is not limited by the particular method shown.

For each transmission line 32 attached to the local bus of the generator 12 in the power system, there is a current sensor 46 and line voltage sensor 48. From all of these sensors, the phase currents and line voltages of the transmission lines are input to an estimator 50. The estimator 50 is a computer similar to that for the instrumentation interface computer 42. It is to be understood that the functions assigned to the various computers in this block diagram are grouped by function and by concept and might not necessarily be assigned to separate computers in a given installation. The specific configuration of the generating facility would determine the specific hardware implementation used. In addition, several commercially available industrial computer systems exist which use high speed communication protocols for data communication that would form a suitable core system, with the provision for interfacing any special hardware that might be required such as signal processing. Manufacturers of such equipment are Modicon, Inc. (Modicon 984 series), Allen Bradley, General Electric, and others.

The estimator 50 converts measurements of the three-phase voltage and currents ($v_{ai}$, $v_{bi}$ and $v_{ci}$ and $i_{ai}$, $i_{bi}$ and $i_{ci}$) taken from the local bus i into the D-Q reference frame, in the same manner as for the generator voltage and current described above in connection with equation (11). These values in turn are fed to an estimation routine, which may be implemented directly by the same computer, or might possibly be run on a separate machine, to yield estimates of the D-Q voltages ($V_{Dj}$, $V_{Qj}$) at the distant ends j of each transmission line connected to the local bus i of the generator 12. The estimation of these D-Q voltages is performed based on the follow formula:

$$(V_{Dj} + V_{Qj}) = (V_{Di} + jV_{Qi}) - (I_{Di} + jI_{Qi})(R_{ij} + jX_{ij}). \tag{12}$$

which represents Ohm's law relationship as applied to AC circuits operating in sinusoidal quasi-steady-state.

The variables of equation (12) will now be described in connection with FIG. 2. $V_{Dj}$ and $V_{Qj}$ represent the estimated voltage at the distal end of a transmission line, such as end 112 of transmission line 104. Thus, j represents the end of the transmission line, whereas i represents the proximate end of the transmission line, such as local bus 102 for transmission line 104. $V_{Di}$, $V_{Qi}$, $I_{Di}$ and $I_{Qi}$ are the current and voltage of the proximate end of the transmission line, such as 102 (see FIG. 2) which is measured and calculated according to equation 4 above. These values are equal to the generator current and voltage if there if no transformer between the generator terminals and the local power line terminals or if the transformer impedance is low enough to be ignored. If there is a transformer between the generator terminals and the local power line terminals, the voltage and current at the local power line terminals must be measured and the D-Q reference frame values determined. $R_{ij}$ and $X_{ij}$ represent the transmission line impedance between the proximate end i and the distal end j of the transmission line. The values $V_{Dj}$ and $V_{Qj}$ are determined for each of the transmission lines attached to the local bus, e.g., transmission lines 104, 106 and 108 (FIG. 2).

The values of $V_{Dj}$ and $V_{Qj}$ can also be calculated using equation (11) from direct measurement of $v_{aj}$, $v_{bj}$ and $v_{cj}$ at the distal end j of one or more of the relevant transmission lines ij. A radio- or satellite-transmitted synchronizing signal and corresponding data transmission capabilities allow the measured $v_{aj}$, $v_{bj}$ and $v_{cj}$ to be transmitted to the controller at the generating station. Thus $V_{Dj}$ and $V_{Qj}$ are calculated and need not be estimated.

The generator currents are treated differently than those for the transmission lines. That is, the generator currents need to be in a machine (d-q) frame of reference, rather than a network (D-Q) frame of reference for a feedback linearizing controller (to be described below) and a generator state observer (to be described below). This transformation is performed using the following equation where $I_d$ and $I_q$ are the machine frame of reference values and $I_D$ and $I_Q$ are the network frame of reference values as determined according to equation (11):

$$\begin{bmatrix} I_d \\ I_q \end{bmatrix} = \begin{bmatrix} \sin(\delta) & -\cos(\delta) \\ \cos(\delta) & \sin(\delta) \end{bmatrix} \begin{bmatrix} I_D \\ I_Q \end{bmatrix} \quad (13)$$

where $\delta$ is the measured rotor angle. The derivatives of $I_d$ and $I_q$ are also used, and may be calculated according to the simple backward-difference method, as follows:

$$\dot{I}_d = \frac{I_d(t_k) - I_d(t_{k-1})}{t_k - t_{k-1}} \quad (14)$$

A generator state observer 54 takes the excitation field voltage $E_{fd}$ from the exciter 16 and the calculated d-q (machine) reference generator current $I_d$ and $I_q$ and voltage $V_d$ and $V_q$ from instrumentation interface computer 42 and implements an integration routine that provides signals proportional to the internal flux of the generator 12. That is, the state observer 54 generates the values of $E'_d$ and $E'_q$ (the transient machine voltages). These are states in the standard mathematical machine model, and are difficult, if not impossible, to measure directly. One way to obtain their values is by using an observer 54, similar to a linear observer. A simple method starts with the machine equations, $$\dot{E}_d = \frac{1}{T'_{q0}} [-E_d + (x_q - x'_q)I_q] \quad (15)$$

$$\dot{E}_q = \frac{1}{T'_{do}} [-E_q - (x_d - x'_d)I_d + E_{fd}] \quad (16)$$

where $x'_d$ and $x'_q$ are the transient machine reactances, $x_d$ and $x_q$ are the synchronous reactances and $T'_{do}$ and $T'_{qo}$ are the machine time constants. These parameters are well-defined and known for any given machine.

We can consider $V_d$ and $V_q$ to be system outputs, via the relationships $$V_d = E'_d + x'_q I_q \quad (17)$$

$$V_q = E'_q + x'_d I_d \quad (18)$$

If $(x_q - x'_q)I_q$ is then considered to be an input to equation (17), and $-(x_d - x'_d)I_d + E_{fd}$ id considered to be an input to equation (18), then the state observer 54 can be implemented in two separate equations where the circumflex '^' denotes the observed value.

$$\dot{\hat{E}}_d = \frac{1}{T'_{q0}} [-\hat{E}_d + (x_q - x'_q)I_q] - K_d(V_d - \hat{E}_d - x'_q I_q) \quad (19)$$

$$\dot{\hat{E}}_q = \frac{1}{T'_{d0}} [-\hat{E}_q - (x_d - x'_d)I_d + E_{fd}] - K_q(V_q - \hat{E}_q + x'_d I_d) \quad (20)$$

Where the values of $K_d$ and $K_q$, are used to set the convergence properties of the observer 54. It should be understood that other methods may be used to observe $E'_d$ and $E'_q$.

The outputs of the estimator 50, instrumentation interface computer 42 and generator state observer 54 are fed to the decentralized calculation computer 52. This computer is similar to that for the instrumentation interface computer 42 or estimator 50. This part of the system may be implemented as a separate computer or as subroutine executed in another computer such as the estimator 50 or the instrumentation interface computer 42, depending on computational load and timing requirements. The calculation it performs is a modification of the and outputs a rotor angle reference signal $\delta_r$, indicative of an estimated equilibrium rotor angle.

The modification of the ODSS calculation is the provision of a desired terminal voltage $V_{ref}$ in place of a measured terminal voltage, and thus the corresponding function is redefined as:

$$G(V_i \ldots V_{ref} \ldots V_K, \theta_i \ldots \delta_r \ldots \theta_K) = 0 \quad (21)$$

The modified decentralized reference calculation is separated into two parts, to preserve the target voltage $V_{ref}$. The first part involves the calculation of a desired phase angle $\theta_r$ for the local terminal voltage. The first section of the calculation begins with the following relationship for the electrical power transmitted over a transmission line, where $G_{ij}$ and $B_{ij}$ are the conductance and susceptance, respectively, of the transmission line connecting busses i (the local bus) and j, assuming bus i to be the local one, and the factor $C_{ij}$ as 1 when busses i and j are directly connected, 0 when they are not:

$$P_e = V_{ref}^2 G_{ii} - [\alpha \cos(\theta_r) + \beta \sin(\theta_r)] \quad (22)$$

$$\alpha = V_{ref} \sum_{j=1, j \neq i}^{k} C_{ij}(G_{ij}V_{Dj} + B_{ij}V_{Qj}) \quad (23)$$

$$\beta = V_{ref} \sum_{j=1, j \neq i}^{k} C_{ij}(G_{ij}V_{Qj} - B_{ij}V_{Dj}) \quad (24)$$

The actual value of $V_{ref}$ is specified by the operator based on desired reactive power output or other constraints. The solution for $\theta_r$ can be written in closed form as:

$$\theta_r = \cos^{-1}\left(\frac{G_{ii}V_{ref}^2 - P_m}{[\alpha^2 + \beta^2]^{1/2}}\right) + arg(\alpha + j\beta) \quad (25)$$

In this equation, the input mechanical power $P_m$ is substituted for the output electrical power $P_e$ because, in equilibrium, $P_m = P_e$.

The second part of the calculation cannot be solved in closed form if the two machine parameters $x'_d$ and $x'_q$ (the machine transient reactances) are not equal, but is solved by a suitable iterative technique, such as a Gauss/Newton method, applied to the following equation:

$$E'_q x'_q \sin(\delta_r - \theta_r) - E'_d x'_d \cos(\delta_r - \theta_r) + \quad (26)$$

$$V_{ref} \sin(\delta_r - \theta_r)\cos(\delta_r - \theta_r)(x'_d - x'_q) - \frac{P_m x'_d x'_q}{V_{ref}} = 0$$

Equation 26 is solved for $\delta_r$ to provide the estimated equilibrium rotor angle.

The estimated equilibrium rotor angle $\delta_r$ from the decentralized reference calculator 52, the rotor acceleration, speed and angle and generator D-Q reference current from the instrumentation interface computer 42 and the generator internal flux from the generator state observer 54 are provided to a feedback linearizing controller/computer 21 which calculates a field voltage reference signal $E_{ref}$ which is a control signal to be fed to a controlled-rectifier type exciter 16, described above, to set the field voltage $E_{fd}$. With these values, the target field voltage $E_{ref}$ can be calculated as follows:

$$E_{ref} = 1/b(x)(\alpha_o(\delta - \delta_r) + \alpha_1(\omega - \omega_o) + \alpha_2 \dot{\omega} - \rho(x)) \quad (27)$$

where $$\rho(x) = -\frac{\omega_o}{2H} \left\{ \dot{E}_d I_d + E_d \dot{I}_d + E_q \dot{I}_q + \frac{D}{\omega_o} \dot{\omega} - \right. \quad (28)$$

$$\left. E_q \frac{\partial I_q}{\partial E_q} \dot{E}_q - E_d \frac{\partial I_d}{\partial E_q} \dot{E}_q \right\} +$$

-continued $$\frac{\omega_o}{2HT_{do}'} \left\{ E_q \frac{\partial I_q}{\partial E_q'} + E_d \frac{\partial I_d}{\partial E_q'} + I_q \right\} [E_q + (x_d - x_d')I_d]$$

and $$b(\underline{x}) = -\frac{\omega_o}{2HT_{do}'} \left\{ E_q \frac{\partial I_q}{\partial E_q'} + E_d \frac{\partial I_d}{\partial E_q'} + I_q \right\} \quad (29)$$

where D is the damping coefficient, a know machine parameter, and H is the measure of the inertia of the rotor. The partial derivatives of $I_d$ with respect to $E_q'$ in equations 28 and 29 represent the real and imaginary part of the incremental equivalent admittance of the transmission system. It is difficult to measure theses values, however, their upper and lower bounds are well-defined. These values are set to the maximum (upper bound) for the purpose of calculating $E_{ref}$. It has been shown from simulations that little loss in accuracy occurs with this assumption.

The use of an estimated equilibrium rotor angle can be also used to modify a power system stabilizer to base control on a rotor angle error signal, as shown in block diagram form in FIG. 4. Because the sensors and appropriate computational hardware are similar for this system, to arrive at a rotor angle reference signal $\delta_r$, these elements are omitted from the drawing.

The operation of the modified power system stabilizer is substantially similar to the operation of the FBLC, however, the main difference is that it now operates on the basis of a rotor angle error signal rather than a rotor speed or frequency error signal. The decentralized reference calculator 52 determines the estimated equilibrium rotor angle $\delta_r$. The measured rotor angle $\delta$ is determined according to equation (8) above. Adder 20 determines the rotor angle error and applies it to PSS 22. Gain and pole position of the PSS are modified to achieve optimal operation, which is a minor adjustment within the scope of one skilled in the art. A PSS so modified now provides a synchronizing torque, analogous to the restoring force of a spring, proportional to the magnitude of the rotor angle perturbation away from the equilibrium position.

With such a modified PSS, the accuracy of the decentralized reference calculator 52 can be determined without completely refitting the power system.

It has further been shown through simulations that the operation of an existing power system can be improved by replacing as few as one controller for one generator in the system with a controller in accordance with the present invention. Thus, a power system can be improved without completely refilling all generators with a new controller.

Having now described a few embodiments of the present invention it should be understood that the foregoing is merely illustrative, having been presented by way of example only. Numerous other embodiments of the invention are possible without departing from the scope of the present invention. For example, a power system utilizing a static VAR compensator could be modified to operate in response to changes in the estimated local target voltage phase angle $\theta_r$. Also, a HVDC transmission line can be regulated using an estimated local target voltage phase angle as well. These modifications can be made by assuming constant transmission line real power flow. Such modifications are considered to be within the scope of the present invention as defined by the appended claims and equivalents thereto.

We claim:

1. An excitation controller, for an electrical power utility system which includes a generator for providing an output electrical power to a transmission line in response to input mechanical power and an excitation, the controller comprising:

means for receiving an estimate of the voltage magnitude and phase, with respect to a time reference signal, at a distal point on the transmission line, an estimate of the input mechanical power and a desired generator terminal voltage;

means for estimating equilibrium rotor angle according to the estimate of the voltage magnitude and phase, with respect to the time reference signal, at the distal point on the transmission line, the estimate of the input mechanical power and the desired generator terminal voltage and for providing a signal indicative of the equilibrium rotor angle; and means for controlling the excitation provided to the generator according to the signal indicative of the estimated equilibrium rotor angle.

2. In an electrical power utility system which includes a generator for providing an output electrical power to a transmission line in response to input mechanical power and an excitation, the improvement comprising:

means for receiving an estimate of the voltage magnitude and phase, with respect to a time reference signal, at a distal point on the transmission line, an estimate of the input mechanical power and a desired generator terminal voltage;

means for estimating an equilibrium rotor angle according to the estimate of the voltage magnitude and phase, with respect to the time reference signal, at the distal point on the transmission line, the estimate of the input mechanical power and the desired generator terminal voltage and for providing a signal indicative of the equilibrium rotor angle; and means for controlling the excitation provided to the generator according to the signal indicative of the estimated equilibrium rotor angle.

3. An excitation controller, for an electrical power utility system which includes a generator for providing an output electrical power to a transmission line in response to input mechanical power and an excitation, the controller comprising:

means for estimating a voltage magnitude and phase at a distal point of the transmission line according to a measurement of the voltage magnitude and phase and current at a local end of the transmission line;

means, responsive to the estimate of the voltage magnitude and phase, with respect to a time reference signal, at a distal point on the transmission line, an estimate of the input mechanical power and a desired generator terminal voltage, for estimating an equilibrium rotor angle and for providing a signal indicative thereof; and means, responsive to the signal indicative of the estimated equilibrium rotor angle, for controlling the excitation provided to the generator.

4. An excitation controller, for an electrical power utility system which includes a generator for providing an output electrical power to a transmission line in response to input mechanical power and an excitation, the controller comprising:

means, responsive to an estimation of the voltage magnitude and phase, with respect to a time reference signal, at a distal point on the transmission line, the input mechanical power and a desired generator terminal voltage, for estimating an equilibrium rotor angle and for providing a signal indicative thereof; and means, responsive to the signal indicative of the estimated equilibrium rotor angle, for controlling the excitation provided to the generator, wherein the estimate of the voltage magnitude and phase at the distal point on the transmission line is provided by:

means for measuring the voltage magnitude and phase at the distal point of the transmission line;

means, connected to the means for measuring, for transmitting a measurement of the voltage magnitude and phase to the means for estimating an equilibrium rotor angle; and means, responsive to the means for transmitting, for synchronizing the transmitted measurements with the means for estimating.

5. The excitation controller of claim 4 wherein the means for synchronizing includes means for receiving a synchronizing signal from a satellite.

6. A control system for an electrical power system including a generator having a rotor and which provides electrical output power at a voltage magnitude and phase, with respect to a time reference signal, to a transmission line responsive to an excitation controlled by the excitation controller and mechanical input power, the control system comprising:

an equilibrium rotor angle estimator having a first input receiving an estimate of the mechanical input power and a second input receiving an estimate of the voltage magnitude and phase, with respect to a time reference signal, at a distal point on the transmission line and an output providing a signal indicative of an equilibrium generator rotor angle according to the estimate of the input mechanical power, the estimate of voltage magnitude and phase and a desired generator terminal voltage;

a controller having an input connected to the output of the equilibrium rotor angle estimator and an output providing the excitation to the generator according to the equilibrium rotor angle.

7. The control system of claim 6 wherein the controller is a feedback linearizing controller.

8. The control system of claim 6 wherein the controller is a power system stabilizer.

9. A control system for a an electrical power system including a generator having a rotor and which provides electrical output power at a voltage magnitude and phase, with respect to a time reference signal, to a transmission line responsive to an excitation controlled by the excitation controller and mechanical input power, the control system comprising:

an equilibrium rotor angle estimator having a first input receiving an estimate of the mechanical input power and a second input receiving an estimate of the voltage magnitude and phase, with respect to a time reference signal, at a distal point on the transmission line and an output providing a signal indicative of an equilibrium rotor angle;

a position encoder providing an output signal indicative of an angular position of the rotor;

means for determining an angle of the rotor according to the output signal of the position encoder and the time reference signal, and providing an output signal indicative of the angle; and means for comparing the determined rotor angle to the estimated equilibrium rotor angle to generate a signal indicative of a rotor angle error; and a power system stabilizer having an input connected to the output of the means for comparing and an output providing the excitation to the generator according to the rotor angle error.

10. A controller for an electrical power generator having a rotor, comprising:

a computer which periodically determines an estimated equilibrium rotor angle and provides a signal indicative of said angle, a sensor for periodically measuring a rotor angle and providing as an output a signal indicative thereof;

means, responsive to the signals from the computer and the sensor, for periodically generating a signal indicative of a rotor angle error;

a power system stabilizer, connected to the means for generating and responsive thereto to provide periodically a signal indicative of voltage correction term; and an exciter which receives a desired generator terminal voltage, a measure of an actual generator terminal voltage and the voltage correction term from the power system stabilizer to provide periodically a field excitation to the electrical power generator responsive thereto.

11. The system of claim 10 wherein the computer includes means for storing a desired local terminal voltage, means for determining a desired phase angle for the desired local terminal voltage, and means, responsive to the means for storing and means for determining, for estimating the equilibrium rotor angle.

12. The system of claim 11 wherein the desired local terminal voltage is specified by an operator based one desired reactive power output.

13. An excitation controller for an electrical power generator which provides electrical output power to a transmission line in response to input mechanical power and an excitation, comprising:

means for periodically receiving a equilibrium rotor angle reference signal according to a time reference signal; and means, responsive to the means for receiving, for periodically generating a signal indicative of a desired excitation control as a function of the equilibrium rotor angle and for providing the signal to control an exciter which provides the excitation for the generator.

14. A method for controlling excitation of a generator having a rotor which provides output electrical power to a transmission line in response to input mechanical power and an excitation, comprising the steps of:

periodically estimating an equilibrium rotor angle according to status information of the generator and the transmission line, sampled according to a time reference signal; and controlling the excitation provided to the generator according to the estimated equilibrium rotor angle.

15. An electrical power generating system including at least first and second generating stations connected by a transmission grid, wherein the first generating station has a first generator and first excitation controller for controlling the first generator and the second generating station has a second generator and second excitation controller for controlling the second generator, wherein each generator provides output electrical power to a transmission line in the transmission grid in response to input mechanical power and an excitation, characterized in that each excitation controller comprises:

means for receiving an estimate of the voltage magnitude and phase, with respect to a time reference signal provided for the generator controlled by the excitation controller and independently of other generators, at a distal point on the transmission line, an estimate of the input mechanical power and a desired generator terminal voltage;

means for estimating an equilibrium rotor angle for the generator controlled by the excitation controller according to the estimate of the voltage magnitude and phase, with respect to the time reference signal provided for the generator controlled by the excitation controller and independently of other generators, at the distal point on the transmission line, the estimate of the input mechanical power and the desired generator terminal voltage, and for providing a signal indicative of the equilibrium rotor angle; and means for controlling the excitation provided to the generator according to the signal indicative of the estimated equilibrium rotor angle.

16. For use with a generator having a controller which affects generator output voltage, a method for determining an equilibrium rotor angle, comprising the steps of:

measuring variables from which an input mechanical power to the generator may be determined;

measuring variables from which an output electrical power of the generator may be determined;

providing a predetermined reference voltage for the generator output voltage; and evaluating a function of the input mechanical power, the output electrical power and the predetermined reference voltage to provide an estimate of the equilibrium rotor angle.

17. An equilibrium rotor angle estimator for use with a generator having a rotor and which provides an output electrical power at a voltage to a transmission line in response to input mechanical power, comprising:

means, responsive to a measure of voltage magnitude and phase, with respect to a time reference signal, and on the transmission line, a desired generator output voltage, and a measure of the input mechanical power, for determining a desired phase angle for the output voltage of the generator; and means responsive to the means for determining to provide an output signal indicative of an equilibrium generator rotor angle.

18. A method for determining a desired phase angle for a local terminal voltage for a generator in an electrical power system, including the steps of:

measuring variables from which an input mechanical power of the generator may be determined;

measuring variables from which an output electrical power of the generator may be determined;

providing a predetermined reference voltage for the generator output voltage; and evaluating a function of the input mechanical power, the output electrical power and the predetermined reference voltage to estimate the desired phase angle for the generator output voltage.

19. A method for determining an equilibrium rotor angle for a generator which provides an output electrical power at a terminal voltage in response to an input mechanical power, comprising the steps of:

providing a predetermined reference voltage for the generator output voltage;

determining a transient reactance of the generator;

determining a desired phase angle for the generator output voltage;

determining an estimate of an input mechanical power of the generator; and evaluating a function of the basis of the transient reactance, the input mechanical power, the desired phase angle and the predetermined reference voltage to estimate the equilibrium rotor angle.

20. The method of claim 14 further comprising the step of estimating the voltage magnitude and phase with respect to a time reference signal, at a distal point of the transmission line and wherein the step of estimating the equilibrium rotor angle involves using the estimated voltage magnitude and phase.

21. The method of claim 20 wherein the step of estimating the voltage magnitude and phase includes using a measurement of the voltage magnitude and phase, with respect to a time reference signal, and current at a local end of the transmission line.

22. The method of claim 20 wherein the step of estimating the voltage magnitude and phase at the distal point on the transmission line includes the steps of:

measuring the voltage magnitude and phase at the distal point on the transmission line;

transmitting the measurement of the voltage magnitude and phase to a local point on the transmission line; and synchronizing use of the transmitted measurements with the steps of estimating the equilibrium rotor angle.

23. The method of claim 22 wherein the step of synchronizing includes the step of receiving a synchronizing signal from a satellite.

24. The method of claim 14 wherein the step of controlling includes using a feedback linearizing controller.

25. The method of claim 14 wherein the step of controlling includes using a power system stabilizer.

26. The method of claim 25 further comprising the steps of:

providing a time reference signal;

using a position encoder to provide an output signal indicative of an angular position of the rotor;

determining an angle of the rotor on the basis of the output signal of the position encoder and the time reference signal; and comparing the determined rotor angle to the estimated equilibrium rotor angle to generate a signal, indicative of a rotor angle error, which is supplied to the power system stabilizer.

27. The method of claim 14 further comprising the steps of providing a desired local terminal voltage; and determining a desired phase angle for the desired local terminal voltage, and wherein the step of estimating the equilibrium rotor angle includes using the desired local terminal voltage and the desired phase angle.

28. The method of claim 27 wherein the desired local terminal voltage is specified by an operator based on desired reactive power output.

29. A control system for an electrical power system including a generator having a rotor and which provides electrical output power at a voltage magnitude and phase, with respect to a time reference signal, to a transmission line responsive to an excitation controlled by the excitation controller and mechanical input power, the control system comprising:

an equilibrium rotor angle estimator having a first input receiving an estimate of the mechanical input power and a second input receiving an estimate of the voltage magnitude and phase, with respect to a time reference signal, at a distal point on the transmission line and an output providing a signal indicative of an equilibrium generator rotor angle;

a controller having an input connected to the output of the equilibrium rotor angle estimator and an output providing the excitation to the generator; and wherein the estimate of a voltage magnitude and phase at the distal point of the transmission line is obtained using means for estimating the voltage magnitude and phase at the distal point responsive to a measurement of the voltage magnitude and phase, with respect to a time reference signal, and current at a local end of the transmission line.

30. A control system for an electrical power system including a generator having a rotor and which provides electrical output power at a voltage magnitude and phase, with respect to a time reference signal, to a transmission line responsive to an excitation controlled by the excitation controller and mechanical input power, the control system comprising:

an equilibrium rotor angle estimator having a first input receiving an estimate of the mechanical input power and a second input receiving an estimate of the voltage magnitude and phase, with respect to a time reference signal, at a distal point on the transmission line and an output providing a signal indicative of an equilibrium generator rotor angle;

a controller having an input connected to the output of the equilibrium rotor angle estimator and an output providing the excitation to the generator, wherein the estimate of the voltage magnitude and phase at the distal point on the transmission line is provided by:

means for measuring the voltage magnitude and phase with respect to a time reference signal at the distal point of the transmission line;

means, connected to the means for measuring, for transmitting a measurement of the voltage magnitude and phase to the means for estimating an equilibrium rotor angle; and means, responsive to the means for transmitting, for synchronizing the transmitted measurements with the means for estimating.

31. The control system of claim 30 wherein the means for synchronizing includes means for receiving a synchronizing signal from a satellite.

32. The control system of claim 6 wherein the computer includes means for storing a desired local terminal voltage, means for determining a desired phase angle for the desired local terminal voltage, and means, responsive to the means for storing and means for determining, for estimating the equilibrium rotor angle.

33. The control system of claim 6 wherein the desired local terminal voltage is specified by an operator based on desired reactive power output.

34. For use with a generator having a controller which affects generator output voltage, a system for determining an equilibrium rotor angle, comprising:

means for measuring variables from which an input mechanical power to the generator may be determined;

means for measuring variables from which an output electrical power of the generator may be determined;

means for providing a predetermined reference voltage for the generator output voltage; and means for evaluating a function of the input mechanical power, the output electrical power and the predetermined reference voltage to provide an estimate of the equilibrium rotor angle.

35. A system for determining a desired phase angle for a local terminal voltage for a generator in an electrical power system, including:

means for measuring variables from which an input mechanical power of the generator may be determined;

means for measuring variables from which an output electrical power of the generator may be determined;

means for providing a predetermined reference voltage for the generator output voltage; and means for evaluating a function of the input mechanical power, the output electrical power and the predetermined reference voltage to estimate the desired phase angle for the generator output voltage.

36. A system for determining an equilibrium rotor angle for a generator which provides an output electrical power at a terminal voltage in response to an input mechanical power, comprising:

means for providing a predetermined reference voltage for the generator output voltage;

means for determining a transient reactance of the generator;

means for determining a desired phase angle for the generator output voltage;

means for determining an estimate of an input mechanical power of the generator; and means for evaluating a function of the basis of the transient reactance, the input mechanical power, the desired phase angle and the predetermined reference voltage to estimate the equilibrium rotor angle.

* * * * *